US010207457B2

(12) United States Patent
Odaka

(10) Patent No.: US 10,207,457 B2
(45) Date of Patent: Feb. 19, 2019

(54) METHOD FOR BONDING COMPONENTS BY USING ENERGY RAY-CURABLE ADHESIVE

(71) Applicant: FANUC CORPORATION, Yamanashi (JP)

(72) Inventor: Shunichi Odaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 276 days.

(21) Appl. No.: 15/049,631

(22) Filed: Feb. 22, 2016

(65) Prior Publication Data
US 2016/0250802 A1   Sep. 1, 2016

(30) Foreign Application Priority Data

Feb. 27, 2015   (JP) .................. 2015-039096

(51) Int. Cl.
*B29C 65/48* (2006.01)
*G01D 5/347* (2006.01)
(Continued)

(52) U.S. Cl.
CPC ...... *B29C 65/4845* (2013.01); *B29C 65/1403* (2013.01); *B29C 65/1406* (2013.01); *B29C 65/1441* (2013.01); *B29C 66/1222* (2013.01); *B29C 66/1224* (2013.01); *B29C 66/5344* (2013.01); *B29C 66/71* (2013.01); *B29C 66/733* (2013.01); *B29C 66/7392* (2013.01);
(Continued)

(58) Field of Classification Search
CPC ............ B29C 65/4845; B29C 65/1403; B29C 65/1406; B29C 65/1441; B29C 66/1222; B29C 66/1224; B29C 66/5344; B29C 66/71; B29C 66/733; B29C 66/7392
See application file for complete search history.

(56) References Cited

U.S. PATENT DOCUMENTS

| 2004/0245443 | A1* | 12/2004 | Imai | G01D 5/34707 250/231.13 |
| 2012/0089180 | A1* | 4/2012 | Fathi | B41J 2/17559 606/214 |
| 2012/0229799 | A1* | 9/2012 | Ahrendt | G01D 5/34707 356/138 |

FOREIGN PATENT DOCUMENTS

| CN | 102186937 A | 9/2011 |
| CN | 102468201 A | 5/2012 |

(Continued)

OTHER PUBLICATIONS

English Abstract and Machine Translation for Japanese Publication No. 2007-278927 A, published Oct. 25, 2007, 14 pgs.
(Continued)

*Primary Examiner* — Daniel McNally
(74) *Attorney, Agent, or Firm* — Fredrikson & Byron, P.A.

(57) ABSTRACT

A method for bonding components to each other according to this invention bonds, to a plate-shaped member or a shaft, an ultraviolet-curable adhesive cured by irradiation with ultraviolet rays and a wavelength conversion element which emits ultraviolet rays by irradiation with X-rays. The plate-shaped member is brought into contact with the shaft through a bonding layer formed by the ultraviolet-curable adhesive and the wavelength conversion element. The X-rays are transmitted through the plate-shaped member or the shaft to the bonding layer located between the plate-shaped member and the shaft to cure the ultraviolet-curable adhesive.

3 Claims, 5 Drawing Sheets

(51) Int. Cl.
  *B29C 65/14* (2006.01)
  *B29C 65/00* (2006.01)
  *F16B 11/00* (2006.01)
  *B29L 31/00* (2006.01)
(52) U.S. Cl.
  CPC ........ *F16B 11/006* (2013.01); *G01D 5/34738* (2013.01); *B29C 65/1409* (2013.01); *B29K 2995/0025* (2013.01); *B29L 2031/748* (2013.01)

(56) References Cited

FOREIGN PATENT DOCUMENTS

| | | | |
|---|---|---|---|
| CN | 102470636 A | 5/2012 | |
| CN | 103792767 A | 5/2014 | |
| DE | 19942993 A1 | 3/2001 | |
| EP | 823561 A1 | 2/1998 | |
| JP | 1011822 A | 1/1998 | |
| JP | 200399946 A | 4/2003 | |
| JP | 2004325231 A | 11/2004 | |
| JP | 2007121142 A | 5/2007 | |
| JP | 2007278927 A | 10/2007 | |
| JP | 2008002970 A | 1/2008 | |
| WO | 2009114567 A1 | 9/2009 | |
| WO | 2013114567 A1 | 8/2013 | |

OTHER PUBLICATIONS

English Abstract and Machine Translation for Japanese Publication No. 2008-002970 A, published Jan. 10, 2008, 9 pgs.
English Abstract and Machine Translation for Japanese Publication No. 2004-325231 A, published Nov. 18, 2004, 9 pgs.
English Abstract and Machine Translation for Japanese Publication No. 2003-099946 A, published Apr. 4, 2003, 27 pgs.
English Abstract and Machine Translation for Japanese Publication No. 10-011822 A, published Jan. 16, 1998, 10 pgs.
English Machine Translation for International Publication No. WO 2013/114567 A1, published Aug. 8, 2013, 5 pgs.
English Abstract and Machine Translation for Japanese Publication No. 2007-121142 A, published May 17, 2007, 6 pgs.
Untranslated Decision to Grant a Patent mailed by Japanese Patent Office (JPO) for Application No. JP 2015-039096, dated Oct. 5, 2017, 3 pgs.
English machine translation of Decision to Grant a Patent mailed by Japanese Patent Office (JPO) for Application No. JP 2015-039096, dated Oct. 5, 2017, 3 pgs.
Untranslated Notification of Reasons for Refusal mailed by Japan Patent Office (JPO) for Application No. JP 2015-039096, dated Apr. 4, 2017, 3 pgs.
English machine translation for Notification of Reasons for Refusal mailed by Japan Patent Office (JPO) for Application No. JP 2015-039096, dated Apr. 4, 2017, 3 pgs.
English Abstract and Machine Translation for Chinese Publication No. 102470636 A, published May 23, 2012, 6 pgs.
English Abstract and Machine Translation for Chinese Publication No. 102468201 A, published May 23, 2012, 8 pgs.
English Abstract and Machine Translation for European Publication No. 0823561 A1, published Feb. 11, 1998, 5 pgs.
English Abstract and Machine Translation for Chinese Publication No. 102186937 A, published Sep. 14, 2011, 20 pgs.
English Abstract and Machine Translation for Chinese Publication No. 103792767 A, published May 14, 2014, 12 pgs.
English Abstract and Machine Translation for German Publication No. 19942993 A1, published Mar. 15, 2001, 7 pgs.

\* cited by examiner

METHOD FOR BONDING COMPONENTS BY USING ENERGY RAY-CURABLE ADHESIVE

FIELD OF THE INVENTION

The present invention relates to a method for bonding components and, more particularly, to a method for bonding components by using an energy ray-curable adhesive, e.g., an ultraviolet-curable adhesive.

DESCRIPTION OF THE RELATED ART

An ultraviolet-curable adhesive (to be abbreviated as a UV adhesive hereinafter) cured by irradiation with ultraviolet rays is commonly used to bond several components to each other. The UV adhesive has an advantage of obviating the need to mount a mechanical coupling mechanism on components. Since the UV adhesive remains uncured until it is irradiated with ultraviolet rays, it has another advantage of adjusting the relative position between two components before curing. On the other hand, the ultraviolet rays are preferably reliably guided to the UV adhesive in curing it. This may be achieved by fabricating such components using an ultraviolet transmissive material. When no such ultraviolet transmissive material is available, a path which guides the ultraviolet rays to the UV adhesive between the components may be ensured.

The above-mentioned preferred process takes place when, e.g., components which constitute an optical rotary encoder are bonded to each other by using a UV adhesive. FIG. 3A is a side view illustrating an optical rotary encoder according to the conventional example and FIG. 3B is a perspective view of the rotary encoder illustrated in FIG. 3A. FIG. 4A is a side view illustrating a mode in which the rotary encoder illustrated in FIG. 3A is disassembled into two components and FIG. 4B is a perspective view of the mode illustrated in FIG. 4A. In the following description based on these drawings, the top-to-down direction in each drawing is defined as the vertical direction.

In an optical rotary encoder, a first plate-shaped member 1 is opposed to a second plate-shaped member 2, as illustrated in FIGS. 3A, 3B, 4A, and 4B. The second plate-shaped member 2 is implemented in a disk, on which a plurality of slits (not illustrated) including transparent and nontransparent portions are circumferentially formed. A plurality of slits (not illustrated) are further formed in the surface of the first plate-shaped member 1 opposed to the second plate-shaped member 2, as in the second plate-shaped member 2.

Shaft receiving holes 1a and 2a to receive a shaft 3 are formed at the central portions of the plate-shaped members 1 and 2, respectively. The shaft 3 is free to rotate in the shaft receiving hole 1a of the first plate-shaped member 1. The first plate-shaped member 1 is fixed in position by a fixing mechanism (not illustrated) so as not to rotate integrally with the shaft 3. In contrast to this, the second plate-shaped member 2 is connected to the shaft 3 so as to rotate integrally with the shaft 3.

The plate-shaped members 1 and 2 (see FIG. 3A) assembled in the above-mentioned way are located in an optical path (not illustrated) formed between a light-emitting element and a light-receiving element. The surfaces of the respective plate-shaped members 1 and 2, provided with the slits, are set perpendicular to the above-mentioned optical path. With such an arrangement, when the transparent portions of the slits in the first plate-shaped member 1 and the second plate-shaped member 2 perfectly coincide with each other, all the light from the light-emitting element passes through the two plate-shaped members 1 and 2 and reaches the light-receiving element. On the other hand, the amount of light which reaches the light-receiving element changes upon rotation of the second plate-shaped member 2 by the shaft 3. Based on this change in amount of light, the position of the second plate-shaped member 2 relative to the first plate-shaped member 1, i.e., the rotational angle of the second plate-shaped member 2 can be detected.

In such an encoder capable of detecting the rotational angle, the two opposed plate-shaped members 1 and 2 preferably have a high degree of parallelism. Therefore, a distance defining unit which defines a constant distance between the first plate-shaped member 1 and the second plate-shaped member 2 is located on the shaft 3 that rotates the second plate-shaped member 2. The distance defining unit uses a shaft portion (to be referred to as a "large-diameter portion" hereinafter) 3b having a diameter larger than that of a shaft portion 3a to be inserted into the shaft receiving hole 2a in the second plate-shaped member 2.

The shaft portion 3a is inserted into the shaft receiving hole 2a in the second plate-shaped member 2, the upper surface of the large-diameter portion 3b is abutted against the second plate-shaped member 2, and in this state the second plate-shaped member 2 and the shaft portion 3a are bonded to each other. When a mechanical coupling mechanism, e.g., a screw is used to bond the second plate-shaped member 2 and the shaft portion 3a to each other, local stress is applied to the second plate-shaped member 2 so the second plate-shaped member 2 may deform. To prevent this, an adhesive is used to fix the second plate-shaped member 2 to the large-diameter portion 3b.

Bringing the second plate-shaped member 2 close to the first plate-shaped member 1 makes it possible to enhance the degree of parallelism of light transmitted through the first plate-shaped member 1 and the second plate-shaped member 2 and suppress diffraction on the edges of the transparent portions of the slits. Therefore, since it is undesired to interpose a mechanical coupling mechanism between the large-diameter portion 3b and the second plate-shaped member 2, an adhesive is used.

The second plate-shaped member 2 is accurately radially positioned relative to the first plate-shaped member 1 by fitting the shaft portion 3a and the shaft receiving hole 2a to each other. In other words, one method positions the second plate-shaped member 2 by bringing the outer peripheral surface of the shaft portion 3a into contact with the inner peripheral surface defining the shaft receiving hole 2a in the radial direction with a given processing accuracy of the shaft portion 3a and the shaft receiving hole 2a. When a high positioning accuracy is preferably set, another method forms a small space between the outer peripheral surface of the shaft portion 3a and the inner peripheral surface defining the shaft receiving hole 2a to radially adjust the position of the second plate-shaped member 2 and then fix the second plate-shaped member 2 in position. When the second plate-shaped member 2 is positioned and fixed without contact in the radial direction, the shaft receiving hole 2a can be formed as a hole which does not extend through the second plate-shaped member 2.

When a reference in the rotational direction is set in the rotary encoder, the second plate-shaped member 2 and the shaft portion 3a are axially rotated relative to each other and adjusted to the reference in the rotational direction (not illustrated), thereby being fixed in position. As a matter of course, this rotational position adjustment is performed when the shaft portion 3a and the shaft receiving hole 2a are fitted to each other or the second plate-shaped member 2 is positioned without contact between the shaft portion 3a and the portion defining the shaft receiving hole 2a in the radial direction, as mentioned earlier.

When the second plate-shaped member 2 is fixed in position by the above-mentioned method, an adhesive is applied onto the upper surface of the large-diameter portion 3b and the second plate-shaped member 2 is bonded to the upper surface of the large-diameter portion 3b while fitting the shaft portion 3a and the shaft receiving hole 2a to each other. In this process, an adhesive preferably remains uncured in the period from the application of an adhesive until the completion of fitting between the first plate-shaped member 1 and the second plate-shaped member 2. Therefore, a UV adhesive is employed as the above-described adhesive.

Japanese Laid-open Patent Publication Nos. 2008-002970 and 2007-278927 disclose methods for bonding optical encoder components to each other by using a UV adhesive.

Japanese Laid-open Patent Publication No. 2008-002970 discloses a method for bonding a glass slit plate onto a metal hub by using a UV adhesive in fabricating an optical encoder. According to Japanese Laid-open Patent Publication No. 2008-002970, one end portion of the UV adhesive interposed between the glass slit plate and the metal hub is obliquely irradiated with ultraviolet rays to cure the UV adhesive.

Japanese Laid-open Patent Publication No. 2007-278927 discloses a method for bonding the central portion of the lower surface of a slit disk to one end portion of a rotational shaft by using a UV adhesive in fabricating an optical encoder. According to Japanese Laid-open Patent Publication No. 2007-278927, a slit disk is made of an optical resin or glass, nontransparent portions of slits on the slit disk are formed using a material which transmits ultraviolet to visible light, instead of using a chrome film.

With the optical rotary encoder illustrated in FIGS. 3A and 3B, the second plate-shaped member 2 is preferably radially positioned relative to the first plate-shaped member 1 with high accuracy. Therefore, it is desired to fit the shaft portion 3a and the shaft receiving hole 2a to each other with as small a tolerance as possible.

In the above-described fitting operation, the outer peripheral surface of the shaft portion 3a and the inner peripheral surface defining the shaft receiving hole 2a have only a little space between them. In curing the UV adhesive sandwiched between the second plate-shaped member 2 and the large-diameter portion 3b, the UV adhesive is irradiated with ultraviolet rays from the space between the first plate-shaped member 1 and the second plate-shaped member 2. The UV adhesive between the second plate-shaped member 2 and the large-diameter portion 3b is pressed into a thin bonding layer during bonding. Therefore, irradiating one edge portion of the thin-film UV adhesive exposed from the space between the second plate-shaped member 2 and the large-diameter portion 3b with ultraviolet rays is insufficient to cure the entire UV adhesive.

The foregoing description reveals that in adopting the above-mentioned fitting process, at least one of the first and second plate-shaped members 1 and 2 is preferably made of, e.g., a resin or glass which transmits ultraviolet rays. In other words, no approach is available to fabricate the plate-shaped members 1 and 2 using an ultraviolet non-transmissive material.

A large space X may be formed between the outer surface of the shaft portion 3a and the inner surface defining the shaft receiving hole 2a by setting the above-mentioned tolerance of fit large. FIG. 5 is a perspective view illustrating a mode in which such a space X is formed. In this mode, first, the shaft portion 3a is inserted into the shaft receiving hole 2a in the second plate-shaped member 2 and abuts the upper surface of the large-diameter portion 3b against the second plate-shaped member 2. The space X is filled with a UV adhesive, which is then irradiated with ultraviolet rays and cured. Such a method facilitates curing of the entire UV adhesive. Therefore, the materials of the plate-shaped members 1 and 2 are not limited to an ultraviolet transmissive material.

Unfortunately, in the above-mentioned mode, it is difficult to accurately radially position the second plate-shaped member 2 relative to the first plate-shaped member 1.

Japanese Laid-open Patent Publication No. 2008-002970 proposes a method for obliquely irradiating one edge portion of the UV adhesive interposed between the glass slit plate and the metal hub with ultraviolet rays. With this method, the ultraviolet rays obliquely applied to one edge portion of the UV adhesive enter the glass slit plate. Reflection of the ultraviolet rays is repeated between the nontransparent portions on the slit plate and the hub on the lower side of the slit plate. As a result, the ultraviolet rays propagate from one edge portion of the ultraviolet-curable adhesive to the opposite edge portion so that the ultraviolet-curable adhesive cures.

However, Japanese Laid-open Patent Publication No. 2008-002970 merely discloses a method for bonding a slit plate made of a glass material which transmits ultraviolet rays. In other words, Japanese Laid-open Patent Publication No. 2008-002970 describes no method for satisfactorily curing the UV adhesive interposed between the hub and a slit plate made of an ultraviolet non-transmissive material.

Japanese Laid-open Patent Publication No. 2007-278927 proposes the use of a material which transmits ultraviolet to visible light to form nontransparent portions in the slits on the slit disk. With such a slit disk, since ultraviolet rays are not shielded by the nontransparent portions, the UV adhesive on the lower side of the slit disk can be irradiated with ultraviolet rays from the upper side of the slit disk. However, even the method disclosed in Japanese Laid-open Patent Publication No. 2007-278927 assumes the use of a slit disk made of an ultraviolet transmissive material. In other words, Japanese Laid-open Patent Publication No. 2007-278927 describes no method for sufficiently curing the UV adhesive interposed between a slit disk made of an ultraviolet non-transmissive material and one end portion of a rotational shaft.

SUMMARY OF INVENTION

The present invention provides a bonding method which can satisfactorily cure an energy ray-curable adhesive interposed between two components, including one component made of an energy ray non-transmissive material, e.g., an ultraviolet non-transmissive material, to bond these two components to each other.

The present invention in its first aspect provides a method for bonding a first component containing a material incapable of transmitting an energy ray in a first wavelength range to a second component in fabricating an assembly including the first component and the second component. The method includes: bonding, to one component of the first component and the second component, an energy ray-curable adhesive cured by irradiation with the energy ray in the first wavelength range, and a wavelength conversion element that converts an energy ray in a second wavelength range capable of being transmitted through the first component into an energy ray in the first wavelength range and that emits the energy ray in the first wavelength range; bringing the other component of the first component and the second component into contact with a portion of the one component attached with the energy ray-curable adhesive and the wavelength conversion element; and transmitting the energy ray in the second wavelength range through the first component to the energy ray-curable adhesive and the wavelength conversion element, thus curing the energy ray-curable adhesive.

The present invention in its second aspect provides the bonding method of the first aspect, wherein the energy ray-curable adhesive includes an ultraviolet-curable adhesive cured by irradiation with light in the ultraviolet to blue wavelength range, the energy ray in the second wavelength range includes X-rays or an energy ray having a transmittance higher than that of the X-rays, and the wavelength conversion element includes a phosphor which emits light in the ultraviolet to blue wavelength range in response to the X-rays or the energy ray having the transmittance higher than that of the X-rays.

The present invention in its third aspect provides the bonding method of the first or second aspect, wherein the first component is made of polyetherimide resin.

The present invention in its fourth aspect provides the bonding method of any one of the first to third aspects, wherein the assembly includes an optical encoder and the first component includes a slit plate used for the optical encoder.

These and other objects, features, and advantages of the present invention will become more apparent from a detailed description of typical embodiments of the present invention which are illustrated in the accompanying drawings.

DETAILED DESCRIPTION

Figure 1:
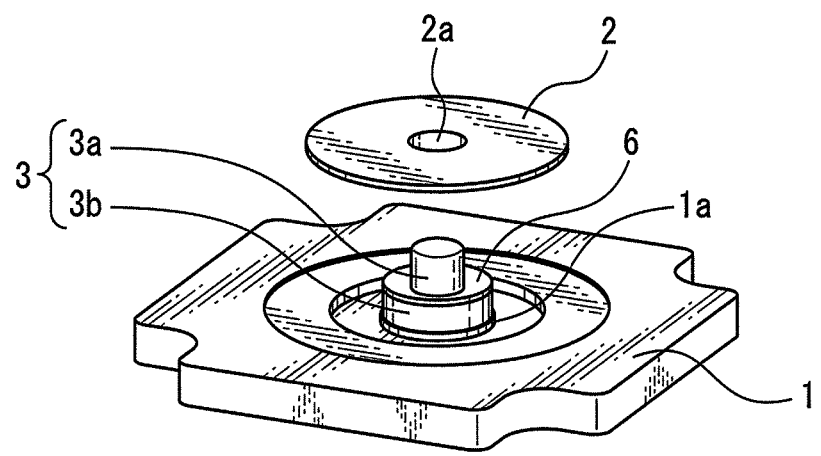
FIG. 1 is an exploded perspective view illustrating an optical rotary encoder to which a bonding method according to the present invention is applicable.

An embodiment of the present invention will be described below with reference to the accompanying drawings. The same reference numerals as in "the Related Art" denote the same components in these drawings. For the sake of a better understanding, these drawings use different scales as appropriate. Although an optical rotary encoder will be taken below as an example of an assembly to which a bonding method according to the present invention is applicable, the present invention is not limited to this.

FIG. 1 is an exploded perspective view illustrating an optical rotary encoder to which a bonding method according to the present invention is applicable.

In the optical rotary encoder, a first plate-shaped member 1 is opposed to a second plate-shaped member 2, as illustrated in FIG. 1. The second plate-shaped member 2 is implemented in a rotational slit plate. A rotational slit plate for an optical encoder is also called a code plate. A plurality of slits (not illustrated) including transparent and nontransparent portions are circumferentially formed on the second plate-shaped member 2. A plurality of slits (not illustrated) are also formed in the surface of the first plate-shaped member 1 opposed to the second plate-shaped member 2, as in the second plate-shaped member 2.

Shaft receiving holes 1a and 2a to receive a shaft 3 are formed at the central portions of the plate-shaped members 1 and 2, respectively. The shaft 3 is free to rotate in the shaft receiving hole 1a of the first plate-shaped member 1. The first plate-shaped member 1 is fixed in position by a fixing mechanism (not illustrated) so as not to rotate integrally with the shaft 3. In contrast to this, the second plate-shaped member 2 is connected to the shaft 3 so as to rotate integrally with the shaft 3.

FIGS. 2A, 2B, 2C, and 2D illustrate in sequence, first, second, third, and fourth process steps, respectively, when the second plate-shaped member 2 is bonded to the shaft 3 in assembling the above-mentioned optical rotary encoder. These drawings represent the respective processes in vertical cross-sections of the shaft 3 and the second plate-shaped member 2 depicted as FIGS. 3A and 3B. Upon defining the upward direction of each drawing as the vertical upward direction and the downward direction of each drawing as the vertical downward direction, an embodiment of the present invention will be described hereinafter.

Figure 2A:
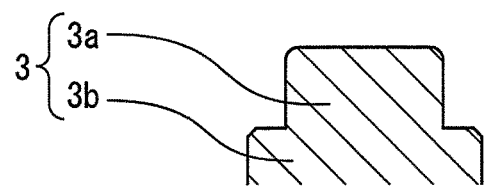
FIG. 2A is a view illustrating a first process step in assembling an optical rotary encoder to which the present invention is applicable.
Figure 3A:
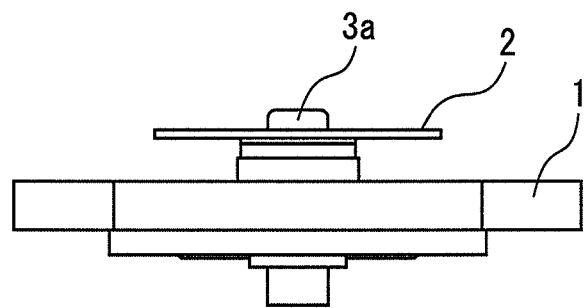
FIG. 3A is a side view illustrating an optical rotary encoder according to the conventional example.
Figure 3B:
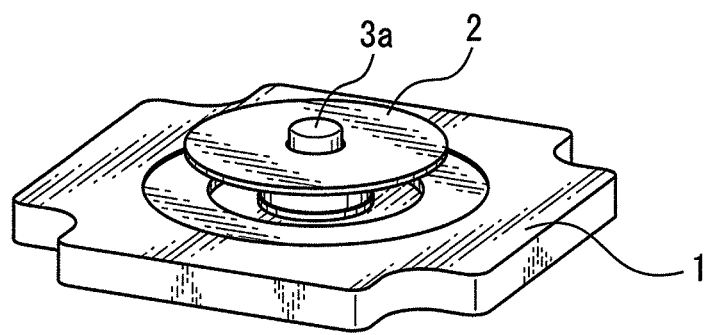
FIG. 3B is a perspective view of the rotary encoder illustrated in FIG. 3A.
Figure 4A:
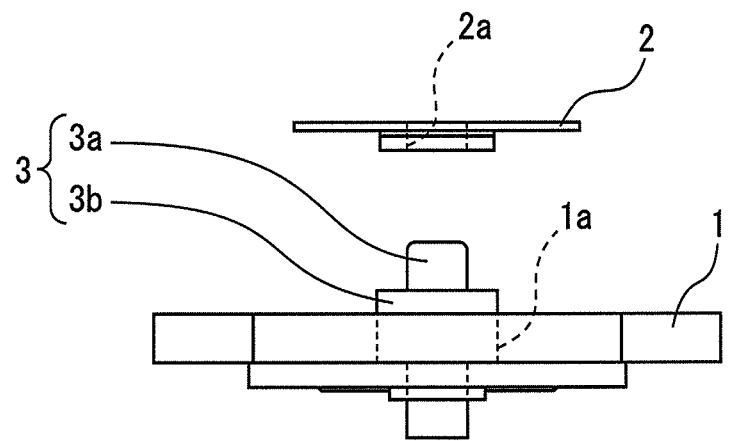
FIG. 4A is a side view illustrating a mode in which the rotary encoder illustrated in FIG. 3A is disassembled into two components.
Figure 4B:
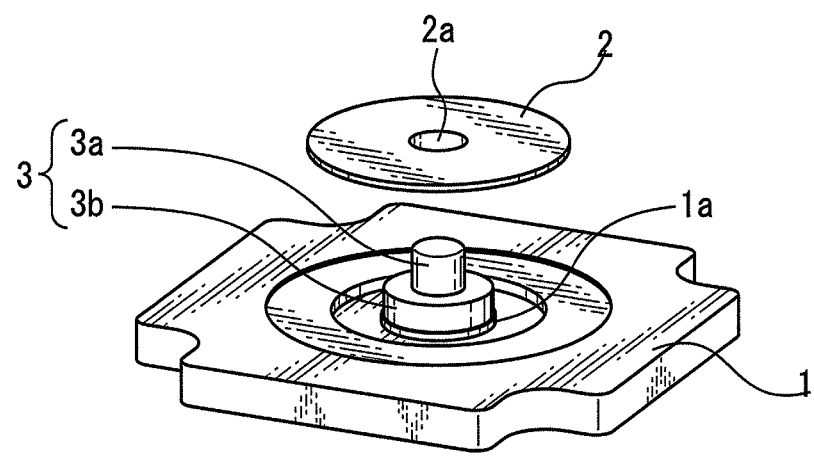
FIG. 4B is a perspective view of the mode illustrated in FIG. 4A.
Figure 5:
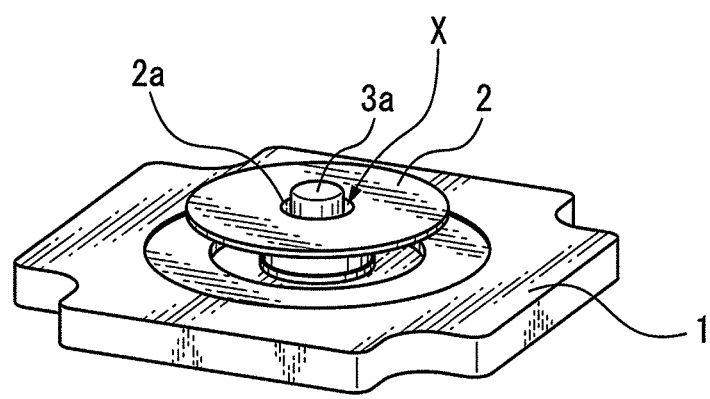
FIG. 5 is a perspective view illustrating a mode in which the fit between a shaft portion and a shaft receiving hole in a second plate-shaped member illustrated in FIG. 3B is loosened.

A shaft 3 is provided first, as illustrated in FIG. 2A. The shaft 3 includes a portion having a diameter larger than that of a shaft portion 3a to be inserted into a shaft receiving hole 2a in a second plate-shaped member 2, i.e., a large-diameter portion 3b. The tolerance of fit between the shaft receiving hole 2a and the shaft portion 3a is set as small as possible. For example, the shaft receiving hole 2a and the shaft portion 3a are preferably fitted to each other based on the tolerance of transition fit.

The adoption of such a tolerance of fit allows accurate radial positioning of the second plate-shaped member 2 relative to the center of the shaft portion 3a during an operation of inserting the shaft portion 3a into the shaft receiving hole 2a.

Figure 2B:
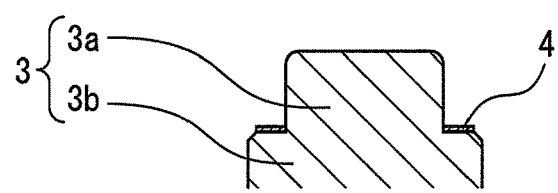
FIG. 2B is a view illustrating a second process step in assembling the optical rotary encoder to which the present invention is applicable.

A wavelength conversion element 4 is attached to the upper surface of the large-diameter portion 3b of the shaft 3, as illustrated in FIG. 2B. A phosphor which emits light in the ultraviolet to blue wavelength range by irradiation with X-rays is used as the wavelength conversion element 4 according to this embodiment. In other words, the wavelength conversion element 4 acts as a phosphor which converts a first energy ray in the wavelength range of about 0.01 nm to about 1 nm into a second energy ray in the wavelength range of about 10 nm to about 450 nm to emit the second energy ray.

Figure 2C:
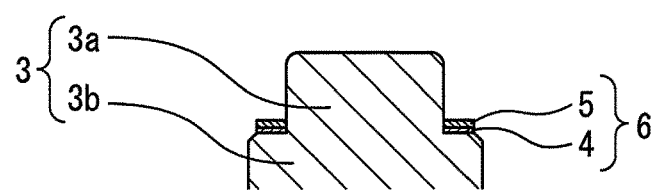
FIG. 2C is a view illustrating a third process step in assembling the optical rotary encoder to which the present invention is applicable.

An ultraviolet-curable adhesive (to be simply referred to as a UV adhesive hereinafter) 5 is attached onto the wavelength conversion element 4, as illustrated in FIG. 2C. The UV adhesive 5 is cured by irradiation with light in the ultraviolet to blue wavelength range (about 10 nm to about 450 nm).

Figure 2D:
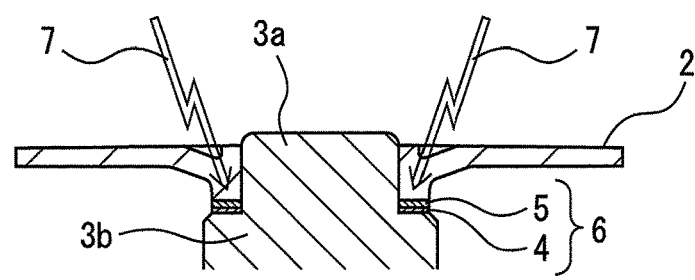
FIG. 2D is a view illustrating a fourth process step in assembling the optical rotary encoder to which the present invention is applicable.

The second plate-shaped member 2 is brought into contact with the upper surface of the large-diameter portion 3b of the shaft 3 while fitting the shaft portion 3a with the shaft receiving hole 2a in the second plate-shaped member 2, as illustrated in FIG. 2D. With this operation, the second plate-shaped member 2 is bonded to the upper surface of the large-diameter portion 3b of the shaft 3 by a bonding layer 6 formed by the wavelength conversion element 4 and the UV adhesive 5.

With this fitting process, since the tolerance of fit between the shaft receiving hole 2a and the shaft portion 3a is set to that of transition fit, the second plate-shaped member 2 is accurately radially positioned relative to the center of the shaft portion 3a.

An ultraviolet non-transmissive material is used as the material of the second plate-shaped member 2 according to this embodiment. Examples of this material may include PEI (Polyetherimide) resin (e.g., Product Name: Ultem (registered trademark)), aluminum, and stainless steel. Applying PEI resin to the material of the second plate-shaped member 2 makes it possible to improve the environmental resistance, impact resistance, heat resistance, and chemical stability of the rotational slit plate.

In the processes illustrated in FIGS. 2B and 2C, although the wavelength conversion element 4 is attached onto the large-diameter portion 3b of the shaft 3 and the UV adhesive 5 is applied onto the wavelength conversion element 4, the present invention is not limited to such processes. For example, a particulate wavelength conversion element 4 may be mixed into the UV adhesive 5 and the obtained mixture may be applied onto the large-diameter portion 3b of the shaft 3. Alternatively, such a mixture or wavelength conversion element 4 may be attached to the lower portion of the second plate-shaped member 2 to be abutted against the upper surface of the large-diameter portion 3b of the shaft 3, instead of attaching it onto the large-diameter portion 3b of the shaft 3.

X-rays 7 are applied from the upper side of the second plate-shaped member 2 to the bonding layer 6 on the large-diameter portion 3b of the shaft 3, as illustrated in FIG. 2D. The X-rays 7 can be transmitted through the second plate-shaped member 2 made of PEI resin and reaches the wavelength conversion element 4 of the bonding layer 6. Upon receiving the X-rays 7, the wavelength conversion element 4 emits light in the ultraviolet to blue wavelength range. The light in the ultraviolet to blue wavelength range then impinges on the entire UV adhesive 5 of the bonding layer 6, which then cures sufficiently. It is, therefore, possible to ensure a given mechanical strength of the bonding portion (a portion forming the bonding layer 6) which bonds the lower surface of the second plate-shaped member 2 to the upper surface of the large-diameter portion 3b of the shaft 3.

In an assembly formed by the above-mentioned processes, most of the UV adhesive 5 illustrated in FIG. 2D is sandwiched between the lower surface of the second plate-shaped member 2 and the upper surface of the large-diameter portion 3b of the shaft 3. Only one edge portion of the bonding layer 6 is exposed in the bonding layer 6. The use of an ultraviolet non-transmissive material to fabricate the second plate-shaped member 2 makes it difficult to irradiate the entire UV adhesive 5 with ultraviolet rays.

To overcome this difficulty, X-rays 7 having a transmittance higher than that of ultraviolet rays are transmitted through the second plate-shaped member 2 to the wavelength conversion element 4 of the bonding layer 6, as described earlier. With this operation, the wavelength conversion element 4 emits light in the ultraviolet to blue wavelength range so that the UV adhesive 5 receives the light in the ultraviolet to blue wavelength range and thereby cures. Thus, although most of the UV adhesive 5 is covered with an ultraviolet non-transmissive member, the bonding method that uses the above-mentioned phosphor forming the wavelength conversion element 4 can satisfactorily cure the UV adhesive 5.

PEI resin can be employed not only as the material of the second plate-shaped member 2 but also for the first plate-shaped member 1 (see FIG. 1) opposed to the second plate-shaped member 2.

In each process step of this embodiment, the shaft 3 is placed to make the shaft portion 3a face vertically upward, as illustrated in FIGS. 2A to 2D. When the shaft 3 is bonded to the second plate-shaped member 2 upon fixing of the orientation of the shaft 3 in the above-mentioned manner, the operations in all the process steps illustrated in FIGS. 2A to 2D can be performed commonly from the upper side, thus facilitating automation. This bonding method also facilitates control of the amounts of a UV adhesive 5 and a wavelength conversion element 4 attached onto the large-diameter portion 3b of the shaft 3.

Other embodiments of the present invention will be described below.

In the above-mentioned embodiment, the UV adhesive 5 cured by irradiation with light in the ultraviolet to blue wavelength range is employed as an adhesive which bonds the second plate-shaped member 2 and the shaft 3 to each other. However, the adhesive applicable to the present invention is not limited to such a UV adhesive 5. In other words, the adhesive used may be an energy ray-curable resin cured by irradiation with light in a wavelength range other than the ultraviolet to blue wavelength range, such as light of, e.g., blue-green or green.

When an energy ray-curable resin cured by irradiation with ultraviolet, violet, blue, blue-green, or green light is used as such an adhesive, a phosphor which emits ultraviolet, violet, blue, blue-green, or green light by irradiation with X-rays is preferably used as the wavelength conversion element 4. Table 1 illustrates such an X-ray phosphor.

TABLE 1

| Phosphor | Emission Spectrum | |
|---|---|---|
| | Emission Color | Peak Wavelength [nm] |
| $BaSO_4$:Eu | Violet | 380 |
| BaFCl:Eu | Violet | 385 |
| BaFBr:Eu | Violet | 390 |
| $CaWO_4$ | Blue | 425 |
| $Gd_2O_2S$:Tb | Green | 545 |
| LaOBr:Tm | Blue | 360, 460 |
| $YTaO_4$:Nb | Blue | 410 |
| $YTaO_4$ | Ultraviolet | 340 |
| $YTaO_4$:Tm | Blue | 360, 460 |
| ZnS:Ag | Blue | 450 |
| (Zn, Cd)S:Ag | Green | 530 |
| $Bi_4Ge_3O_{12}$ | Blue | 480 |
| $CdWO_4$ | Blue-green | 480 |
| $Gd_2O_2S$:Pr | Green | 515 |

TABLE 1-continued

| Phosphor | Emission Spectrum | |
| --- | --- | --- |
| | Emission Color | Peak Wavelength [nm] |
| CsI:Na | Blue | 420 |
| CsI:Tl | Green | 540 |

When an energy ray-curable adhesive cured by irradiation with ultraviolet, violet, blue, blue-green, or green light is used as an adhesive which bonds the second plate-shaped member 2 and the shaft 3 to each other, it suffices to select any X-ray phosphor illustrated in Table 1, in accordance with the emission color preferably used for the curing.

As can be seen from Table 1, when an adhesive cured by ultraviolet light is used, an X-ray phosphor made of $YTaO_4$ (yttrium tantalate) is preferably used for the wavelength conversion element 4. Further, although not illustrated in Table 1, examples of an X-ray phosphor which emits ultraviolet light may include solid phosphors such as diamonds and AlN (aluminum nitride).

When an adhesive cured by violet light is used, an X-ray phosphor containing, e.g., $BaSO_4$:Eu (barium sulfate doped with europium), BaFCl:Eu (barium chloride fluoride doped with europium), or BaFBr:Eu (barium fluorobromide doped with europium) is preferably employed for the wavelength conversion element 4.

When an adhesive cured by blue light is used, an X-ray phosphor containing, e.g., $CaWO_4$ (calcium tungstate), LaOBr:Tm (lanthanum oxybromide doped with thulium), $YTaO_4$:Nb (yttrium tantalate doped with niobium), $YTaO_4$:Tm (yttrium tantalate doped with thulium), ZnS:Ag (zinc sulfide doped with silver), $Bi_4Ge_3O_{12}$ (single-crystal bismuth germinate), or CsI:Na (cesium iodide doped with sodium) is preferably employed for the wavelength conversion element 4. Although not illustrated in Table 1, NaI(Tl) (sodium iodide doped with thallium) or KI (potassium iodide), for example, is also available as an X-ray phosphor which emits blue light.

When an adhesive cured by blue-green light is used, an X-ray phosphor containing $CdWO_4$ (cadmium tungstate) is preferably employed for the wavelength conversion element 4.

When an adhesive cured by green light is used, an X-ray phosphor containing, e.g., $Cd_2O_2S$:Tb (cadmium oxysulfide doped with terbium), (Zn, Cd)S:Ag (zinc sulfide or cadmium sulfide doped with silver), $Cd_2O_2S$:Pr (cadmium oxysulfide doped with praseodymium), or CsI:Tl (cesium iodide doped with thallium) is preferably employed for the wavelength conversion element 4.

For example, in the above-described embodiment, when, as illustrated in FIG. 2D, the X-rays 7 are transmitted through the second plate-shaped member 2 to the wavelength conversion element 4 containing $YTaO_4$ (yttrium tantalate), ultraviolet rays are emitted by the wavelength conversion element 4, thus satisfactorily curing the UV adhesive 5.

Not only an X-ray phosphor containing an inorganic substance, as represented in Table 1, but also an X-ray phosphor containing an organic substance can be employed for the wavelength conversion element 4. Examples of an organic phosphor which emits light in the violet to blue wavelength range by irradiation with X-rays may include an anthracene crystal and organic solids such as polystyrene and polyvinyl toluene. An anthracene crystal has a peak emission wavelength of 440 nm and polystyrene and polyvinyl toluene have a peak emission wavelength of 450 nm.

The above-mentioned phosphors such as NaI(Tl) and CsI:Tl exhibit high emission efficiency for γ-rays. Therefore, although the X-rays 7 are used in the above-described embodiment, γ-rays may be selected in accordance with the type of phosphor used. In other words, an energy ray for enabling a phosphor serving as the wavelength conversion element 4 to emit light is not limited to the X-rays 7, and an energy ray in a wavelength range capable of being transmitted through the materials of components to be bonded to each other, such as α-, β-, or γ-rays may also be used.

An energy ray capable of being transmitted through the materials of components to be bonded to each other may be implemented in a microwave when these materials use no metal. However, the wavelength conversion element 4 used for a microwave is preferred to be an element converting a microwave into a voltage and emits light in the ultraviolet to blue wavelength range by the voltage. An ultraviolet LED is applicable as such a wavelength conversion element 4.

Although the present invention has been described by taking an optical rotary encoder as an example in the above-mentioned embodiment, an assembly to which the present invention is applicable is not limited to an optical rotary encoder. In other words, the present invention is applicable to any type of assembly as long as the assembly includes a bonding portion which bonds arbitrary surfaces of a first component and a second component to each other by using an energy ray-curable adhesive. In particular, the present invention is applicable to an assembly including at least one of first and second components, which is made of a material incapable of transmitting an energy ray preferably used to cure an energy ray-curable adhesive.

Advantageous Effects of Invention

According to the first aspect of the present invention, when the first component is bonded to the second component by using an energy ray-curable adhesive cured by irradiation with an energy ray in the first wavelength range, a wavelength conversion element is added to the energy ray-curable adhesive. The wavelength conversion element emits an energy ray in the first wavelength range by irradiation with an energy ray in the second wavelength range capable of being transmitted through the first component.

An energy ray in the first wavelength range capable of curing the energy ray-curable adhesive is emitted by the wavelength conversion element by transmitting an energy ray in the second wavelength range through the first component to irradiate the energy ray-curable adhesive and the wavelength conversion element. This satisfactorily cures the energy ray-curable adhesive. Therefore, the first component can be made of a material incapable of transmitting the energy ray in the first wavelength range. No configuration for guiding the energy ray in the first wavelength range to the adhesive may be provided to an assembly including the first and second components.

According to the second aspect of the present invention, the method for bonding components to each other in the first aspect can be satisfactorily practiced.

According to the third aspect of the present invention, since the first component is made of polyetherimide resin, environmental resistance, impact resistance, heat resistance, and chemical stability of the first component can be improved.

According to the fourth aspect of the present invention, an optical encoder including a slit plate possessing high environmental resistance, impact resistance, heat resistance, and chemical stability can be provided.

Although typical embodiments have been described above, the present invention is not limited to the above-described embodiments, which can be changed into, e.g., various forms, structures, and materials without departing from the principle of the present invention.

What is claimed is:

1. A method for bonding a first component containing a material incapable of transmitting an energy ray in a first wavelength range to a second component in fabricating an assembly comprising the first component and the second component, wherein the assembly comprises an optical encoder and the first component comprises a slit plate used for the optical encoder, the method comprising:
applying, to one component of the first component and the second component,
a wavelength conversion element that converts an energy ray in a second wavelength range capable of being transmitted through the first component into an energy ray in the first wavelength range and that emits the energy ray in the first wavelength range, and
an energy ray-curable adhesive curable by irradiation with the energy ray in the first wavelength range, the energy ray-curable adhesive being applied on the wavelength conversion element;
bringing the other component of the first component and the second component into contact with the energy ray curable adhesive; and
transmitting the energy ray in the second wavelength range through the first component to the energy ray-curable adhesive and the wavelength conversion element, thus curing the energy ray-curable adhesive.

2. The method according to claim 1, wherein
the energy ray-curable adhesive comprises an ultraviolet-curable adhesive cured by irradiation with light in a range of ultraviolet wavelengths to blue wavelengths,
the energy ray in the second wavelength range comprises one of an X-ray and an energy ray having a transmittance higher than a transmittance of the X-ray, and
the wavelength conversion element comprises a phosphor which emits light in the range of ultraviolet wavelengths to blue wavelengths in response to one of the X-ray and the energy ray having the transmittance higher than the transmittance of the X-ray.

3. The method according to claim 1, wherein the first component is made of polyetherimide resin.

* * * * *